(12) United States Patent
Meyerowitz et al.

(10) Patent No.: US 11,457,108 B2
(45) Date of Patent: *Sep. 27, 2022

(54) CLOUD INTEGRATION TO DESKTOP-BASED EMERGENCY SERVICE APPLICATIONS

(71) Applicant: RapidDeploy, Inc., Austin, TX (US)

(72) Inventors: Brett Meyerowitz, Cape Town (ZA); Jozua Kloppers, Cape Town (ZA); Ivor Chalton, Cape Town (ZA)

(73) Assignee: RapidDeploy, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,189

(22) Filed: Jan. 25, 2021

(65) Prior Publication Data
US 2021/0314442 A1    Oct. 7, 2021

Related U.S. Application Data

(63) Continuation of application No. 16/704,215, filed on Dec. 5, 2019, now Pat. No. 10,911,599.

(60) Provisional application No. 62/776,907, filed on Dec. 7, 2018.

(51) Int. Cl.
*H04M 3/51* (2006.01)
*G08B 25/08* (2006.01)
*H04W 4/90* (2018.01)
*H04W 76/50* (2018.01)

(52) U.S. Cl.
CPC ........... *H04M 3/5116* (2013.01); *G08B 25/08* (2013.01); *H04W 4/90* (2018.02); *H04W 76/50* (2018.02)

(58) Field of Classification Search
CPC ... H04M 3/5116; H04M 3/5133; G08B 25/08; H04W 4/90; H04W 76/50; H04W 4/70
See application file for complete search history.

(56) References Cited

U.S. PATENT DOCUMENTS 9,112,996 B2    8/2015 Klaban
10,911,599 B2*  2/2021 Meyerowitz .......... H04W 76/50
2007/0189480 A1 8/2007 Salafia et al.
(Continued)

OTHER PUBLICATIONS

International Search Report and Written Opinion issued in PCT/US2019/064823 dated Feb. 25, 2020; 16 pages.
(Continued)

*Primary Examiner* — Marisol Figueroa
(74) *Attorney, Agent, or Firm* — Patent Capital Group

(57) ABSTRACT

A desktop agent configured to execute on a computer includes a web-application interface and an agent communication port. The web-application interface receives an application launch request for an emergency service application from a web-based application executing in a browser. The emergency service application has a plurality of application communication ports. The agent communication port transmits a launch message to a selected port of the plurality of application communication ports, the selected port selected based on the application launch request. The agent communication port receives, from the selected port, information collected by the emergency service application responsive to the launch message. The desktop agent is configured to transmit the information collected by the emergency service application to a cloud-based computer aided dispatch system.

20 Claims, 6 Drawing Sheets

(56) References Cited

U.S. PATENT DOCUMENTS

| | | |
|---|---|---|
| 2013/0246960 A1 | 9/2013 | Saylors |
| 2014/0211927 A1 | 7/2014 | Clawson |
| 2014/0243036 A1 | 8/2014 | Kouwe |
| 2015/0120900 A1 | 4/2015 | Sahoo et al. |
| 2016/0088455 A1* | 3/2016 | Bozik ................. H04L 41/0654 370/259 |
| 2016/0119424 A1 | 4/2016 | Kane et al. |

OTHER PUBLICATIONS

International Preliminary Report on Patentability issued in PCT/US2019/064823 dated Jun. 17, 2021; 10 pages.

EPO Extended Search Report issued in PCT/US2019/064823 dated Jun. 27, 2022, 10 pages.

* cited by examiner

CLOUD INTEGRATION TO DESKTOP-BASED EMERGENCY SERVICE APPLICATIONS

CROSS-REFERENCE TO RELATED APPLICATIONS

This application is a continuation of U.S. application Ser. No. 16/704,215, filed Dec. 5, 2019, which claims the benefit of and priority to U.S. Provisional Application No. 62/776,907, filed Dec. 7, 2018, all of which are incorporated by reference in their entireties.

BACKGROUND

This disclosure relates to a mechanism by which a web-based computer aided dispatch (CAD) system can interact with a supplemental desktop-based program, such as a desktop-based program for handling emergency calls.

Traditionally, call-taking and CAD software has been implemented on computers located on-site at public safety answering points (PSAPs). Additional emergency service applications to assist dispatchers, such as a case-entry and key-questioning program, are also locally implemented on the same computers. For example, a dispatcher within a PSAP may use a computer that has both a CAD software program and a case-entry and key-questioning program installed and executing locally. Such emergency service applications are configured to interact with the CAD software, e.g., using transmission control protocol (TCP). For example, a case-entry and key-questioning program is configured to listen on one or more pre-configured TCP ports for requests from a CAD program, and transmit data back to the CAD program over the TCP port. Because CAD programs traditionally ran locally as desktop applications, it was simple to communicate with other emergency service applications using TCP.

Cloud-based call-taking and CAD solutions are currently being developed. Cloud-based call-taking and CAD offers several improvements over traditional on-premises call-taking and CAD systems, including the ability to quickly deploy new features and updates to all users, reduced on-site infrastructure, and increased immunity to malware attacks. However, cloud-based CAD solutions have difficultly integrating with existing emergency service applications that run locally, such as case-entry and key-questioning programs. For example, current web-based CAD systems running on web-browsers are not able to communicate via TCP to desktop-based applications. It is important for call takers to be able to access supplemental call-taking programs, like case-entry and key-questioning programs, because they provide important features for responding to emergency calls, and these features cannot efficiently be replicated.

SUMMARY

In an embodiment, a desktop agent receives an application launch request for an emergency service application. The emergency service application comprises a plurality of application communication ports, and the application launch request comprises data associated with a selected port of the plurality of application communication ports. The desktop agent identifies the selected port based on the application launch request and generates a launch message for the emergency service application to launch the emergency service application. The desktop agent transmits the launch message to the selected port. The desktop agent receives information collected by the emergency service application and transmits the information collected by the emergency service application to a cloud-based computer aided dispatch system.

In another embodiment, a desktop agent is configured to execute on a computer. The desktop agent includes a web-application interface and an agent communication port. The web-application interface is configured to receive an application launch request for an emergency service application from a web-based application executing in a browser. The emergency service application includes a plurality of application communication ports. The agent communication port is configured to transmit a launch message to a selected port of the plurality of application communication ports, the selected port selected based on the application launch request. The agent communication port is further configured to receive, from the selected port, information collected by the emergency service application. The information is collected by the emergency service application responsive to the launch message. The desktop agent is configured to transmit the information collected by the emergency service application to a cloud-based computer aided dispatch system.

BRIEF DESCRIPTION OF THE DRAWINGS

Figure (FIG. 1 is a block diagram of a prior art implementation of emergency software on a dispatcher computer.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Figure 1:
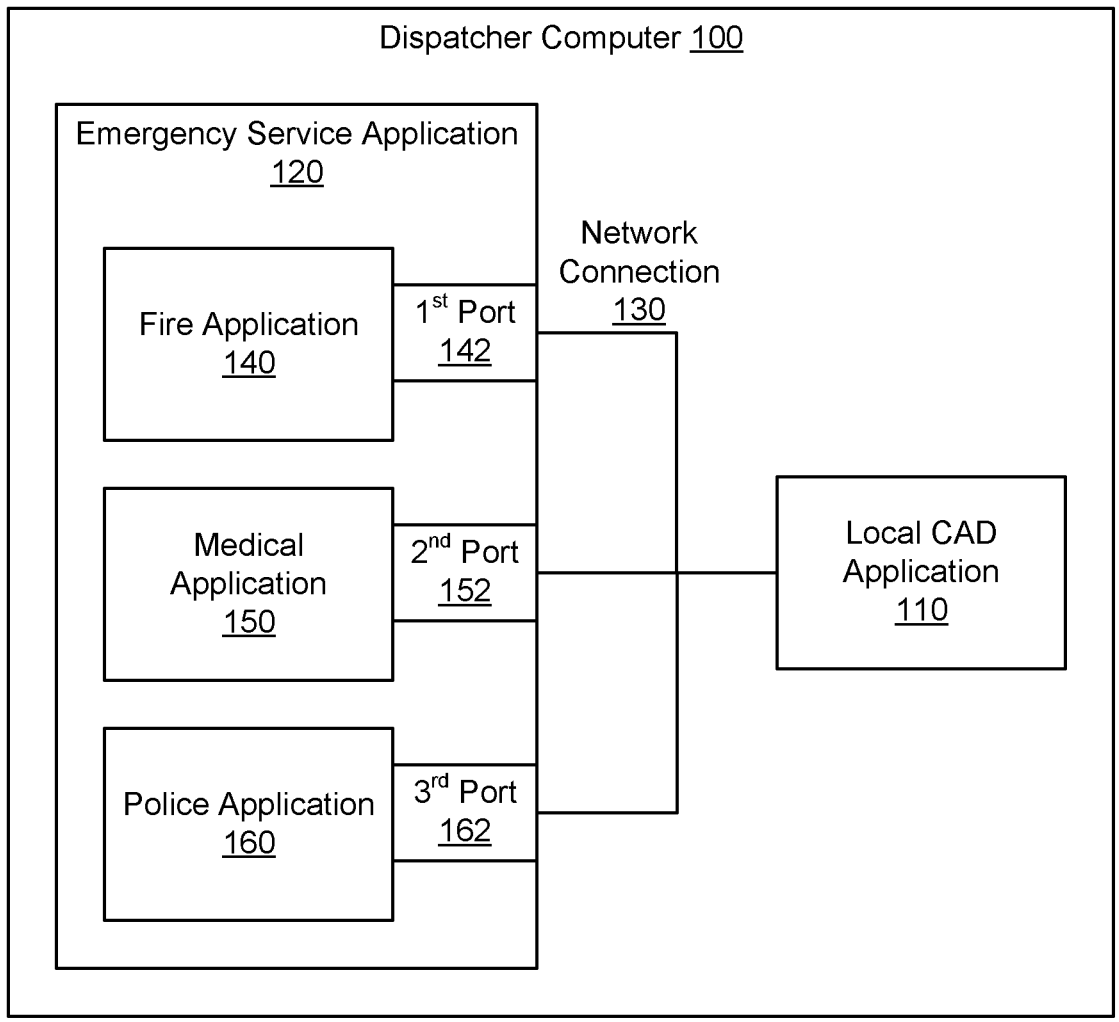

FIG. 1 is a block diagram of a prior art implementation of emergency software on a dispatcher computer. The dispatcher computer 100 has a local CAD application 110 and a supplemental software program (e.g., emergency service application 120) installed thereon. In alternative configurations, different and/or additional components may be included in the dispatcher computer 100. The dispatcher computer 100 is a computer used by a dispatcher to assist in handling emergency calls. The dispatcher computer 100 may be located at a PSAP. Typical dispatcher computers include the hardware and software needed to display user interfaces, detect user input, and connect to networked devices, e.g., call handling equipment at a PSAP for receiving emergency calls and forwarding the emergency calls to the dispatcher computer 100, or data sources providing information about available first responders.

In traditional CAD implementations, each dispatcher computer 100 runs a local CAD application 110. The local CAD application 110 provides information about emergency calls and first responders (e.g., police, fire, and medical responders) to the dispatcher, and enables the dispatcher to connect to first responders and dispatch first responders to the locations of emergencies. The local CAD application 110 is installed on and executed by the dispatcher computer 100. Implementing CAD applications in this manner makes it difficult to deploy software updates and new features, collect and analyze system-wide data, provide failover support, or enable other types of network-based features. However, implementing the local CAD application 110 as a desktop-based program enables simple interaction with other software programs locally implemented on the dispatcher computer, such as the emergency service application 120.

The emergency service application 120 is a secondary program that assists the dispatcher in responding to an emergency call. For example, the emergency service application 120 may be a case-entry and key-questioning program, such as PROQA PARAMOUNT. Case-entry and key-questioning programs implement emergency dispatch protocols that assist dispatchers in quickly identifying relevant information for each emergency call, and provide a response plan to emergency dispatchers, including instructions the dispatcher can provide each caller. Case-entry and key-questioning programs are typically implemented as a separate program from the CAD program, such as the local CAD application 110, and PSAPs often license both software programs to assist their dispatchers.

The local CAD application 110 communicates with the emergency service application 120 over a network connection 130. The network connection may employ a connection protocol such as transmission control protocol (TCP), but could employ other connection protocols. A connection protocol is a standard that defines how to establish and maintain a connection via which application programs can exchange data. In the example shown in FIG. 1, the connection protocol enables the local CAD application 110 to communicate with one or more communication ports on the emergency service application 120. In this example, the emergency service application 120 is pre-configured with three communication ports (e.g., three TCP ports). A first communication port 142 connects to a fire application 140, a second communication port 152 connects to a medical application 150, and a third communication port 162 connects to a police application 160. To initiate a case in the emergency service application 120, the dispatcher may use an interface within the local CAD application 110 to select one of the three applications 140, 150, or 160. For example, if the dispatcher receives a call about a fire, the dispatcher selects a button to launch the fire application 140. The local CAD application 110 transmits a request over the network connection 130 to port 1 142 to initiate the fire application 140. The fire application 140 provides an interactive user interface to the dispatcher to assist the dispatcher in responding to the fire call, and provides data about the call to the local CAD application 110 via the network connection 130.

In some cases, the emergency service application 120 may be configured with a subset of these applications (e.g., 140 and 160) and a corresponding subset of ports (e.g., 142 and 162) based on the dispatching services provided by the PSAP at which the dispatcher computer 100 is located. For example, a dispatcher computer 100 for a dispatcher at a private ambulance company may only implement the medical application 150 and the corresponding second communication port 152.

Figure 2:
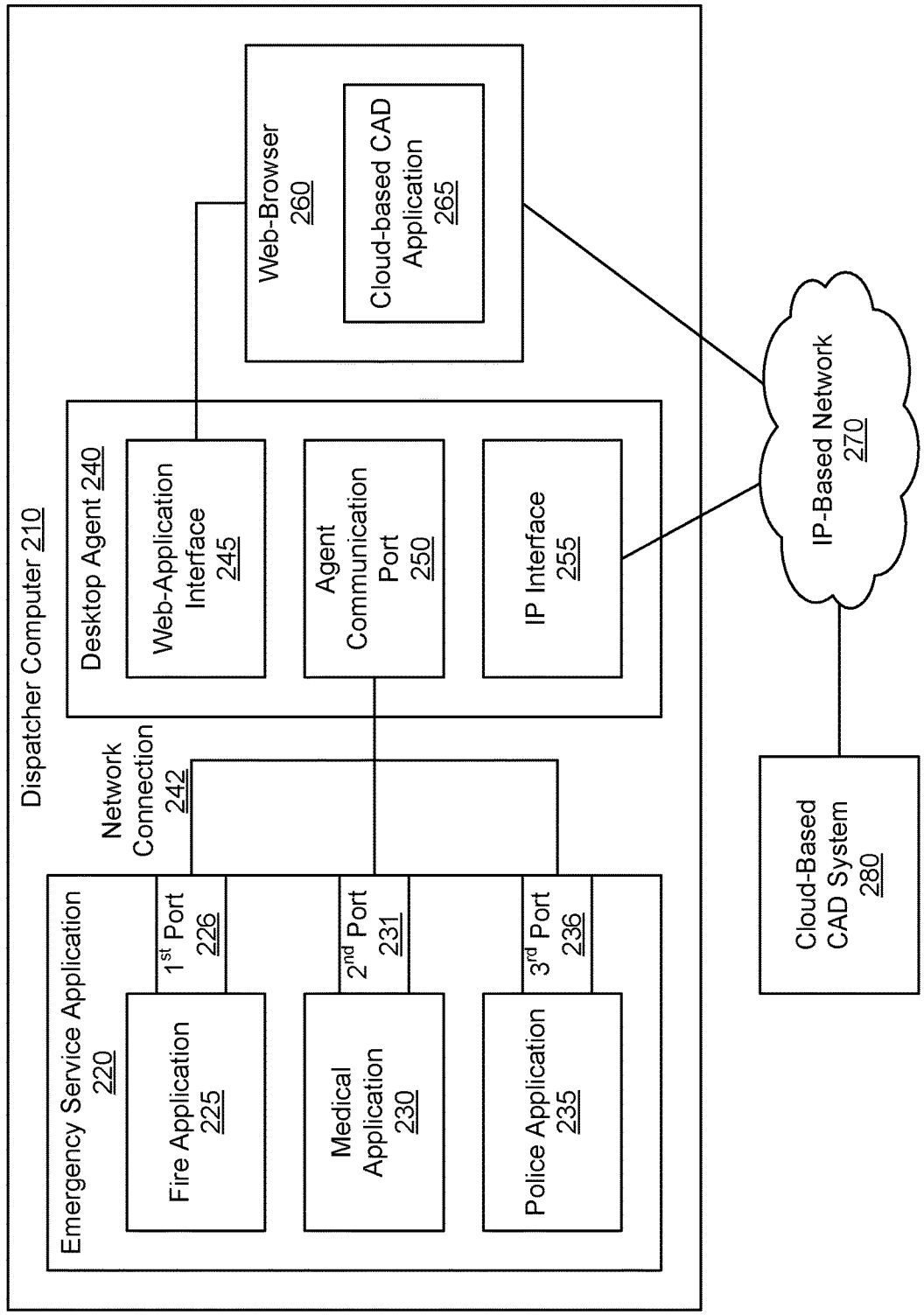
FIG. 2 is a block diagram illustrating an implementation of emergency software in a cloud-based computer aided dispatch (CAD) environment, in accordance with an embodiment.

FIG. 2 is a block diagram illustrating an implementation of emergency software in a cloud-based computer aided dispatch (CAD) environment, in accordance with an embodiment. The environment includes a dispatcher computer 210, an IP-based network 270, and a cloud-based CAD system 280. The dispatcher computer 210 has a supplemental software program (e.g., emergency service application 220), a desktop agent 240, and a web-browser 260 installed thereon. In alternative configurations, different and/or additional components may be included in the dispatcher computer 210. The dispatcher computer 210 is a computer used by a dispatcher to assist in handling emergency calls. The dispatcher computer 210 may be located at a PSAP. The dispatcher computer 210 also includes the hardware and software needed to display user interfaces, detect to user input, and connect to networked devices, e.g., call handling equipment at a PSAP for receiving emergency calls and forwarding the emergency calls to the dispatcher computer 210, or data sources providing information about available first responders.

The emergency service application 220 and the network connection 242 are similar to the emergency service application 120 and network connection 130 described with respect to FIG. 1. Like the example emergency service application 120, the emergency service application 220 has three applications: a fire application 225, a medical application 230, and a police application 235. Each application 225-235 has a respective communication port 226, 231, and 236, similar the communication ports 142, 152, and 162 described with respect to FIG. 1. In other embodiments, the emergency service application 220 includes fewer, additional, or different applications. For example, the emergency service application 220 may be any software application configured to assist a call-taker or other user of the local CAD application 110.

In this embodiment, a CAD service is provided to the dispatcher through the cloud-based CAD system 280, the IP-based network 270, and the web-browser 260. The CAD service provides information about emergency calls and first responders (e.g., police, fire, and medical responders) to the dispatcher, and enables the dispatcher to connect to first responders and dispatch first responders to the locations of emergencies. The cloud-based CAD system 280 connects to the dispatcher computer 210 located at the PSAP via the IP-based network 270. The web-browser 260 is installed on the dispatcher computer 210 and executes a cloud-based CAD application 265 provided by the cloud-based CAD system 280. The cloud-based CAD application 265 is a web-based application that runs in the web-browser 260. The cloud-based CAD application 265 provides an interface to the dispatcher, e.g., via a website loaded by the web-browser 260. For a particular emergency call, the cloud-based CAD system 280 receives data about the emergency call from the cloud-based CAD application 265 and, optionally, from other data sources located at the PSAP or elsewhere. The web-browser 260 displays information about the emergency call received from the cloud-based CAD system 280 to the dispatcher, and the web-browser 260 passes data it receives from the dispatcher to the cloud-based CAD system 280, which processes the data.

The cloud-based CAD system 280 is implemented by one or more highly secure and reliable servers. For example, the cloud-based CAD system 280 may operate on the Microsoft Azure Government cloud. The cloud-based CAD system 280 includes at least one web server for providing the cloud-based CAD application 280 to dispatcher computers, such as dispatcher computer 210. The IP-based network 270 is a network that connects the cloud-based CAD system 280 to the dispatcher computer 210. The IP-based network 270 is a network over which devices transmit and receive communications using Internet Protocol. The IP-based network 270 may provide a secure Internet connection over which the dispatcher computer 210 connects to the cloud-based CAD system 280, such as a connection to the Microsoft Azure Government cloud computing platform. Although one dispatcher computer 210 is shown in FIG. 2, many such dispatcher computers 210 may connect to the cloud-based CAD system 280 via the IP-based network 270.

The dispatcher computer 210 does not have a locally implemented CAD application, as in FIG. 1, but instead accesses the cloud-based CAD application 265 provided by the cloud-based CAD system 280. The cloud-based CAD application 265 allows an operator of the dispatcher computer to access the functionality of a CAD system via the web-browser 260. In other words, an operator is able use a CAD system without having to install, maintain, and update a local CAD application 110 on the dispatcher computer 210.

Unlike the local CAD application 110 shown in FIG. 1, the cloud-based CAD application 265 cannot directly transmit and receive communications with the emergency service application 220 over the network connection 242. In particular, the web-browser 260 that is installed on the dispatcher computer 210, and the cloud-based CAD application 265 running on the web-browser 260, are not able to directly communicate with local applications (e.g., applications 225, 230, 235) of the dispatcher computer 210 using the network connection 242. To enable the cloud-based CAD application 265 to communicate with local applications executing on the dispatcher computer 210, such as the emergency service application 220, a desktop agent 240 is installed locally on the dispatcher computer 210. The desktop agent 240 acts as a bridge between the cloud-based CAD application 265 and the emergency service application 220. Because the desktop agent 240 is a locally-installed application (rather than a browser-based application), the desktop agent 240 is able to communicate directly with local applications (e.g., applications 225, 230, and 235) using the network connection 242. In this manner, the desktop agent 240 can relay information between the cloud-based CAD application 265 and the emergency service application 220.

The desktop agent 240 includes a web-application interface 245, an agent communication port 250, and an IP interface 255. The web-application interface 245 is an interface used to communicate with the web-browser 260, and in particular, with the cloud-based CAD application 265 running on the web-browser 260. The web-application interface 245 maintains an open, real-time communication channel via which the cloud-based CAD application 265 transmits messages, such a request to launch an application of the emergency service application 220. In some embodiments, the desktop agent 240 also transmits messages to the cloud-based application 265 running on the web-browser 260 using the web-application interface 245.

In an example embodiment, the web-application interface 245 is a SignalR hub, and the cloud-based CAD application 265 includes a SignalR client. SignalR is a software library that allows asynchronous, real-time communications with web applications. Thus, the web-application interface 245 allows asynchronous real-time communication with the cloud-based CAD application 265, and, thereby, the cloud-based CAD system 280. In other embodiments, other types of web-application interfaces for communicating between a local application and a web-based application may be used instead of SignalR.

The agent communication port 250 is configured to communicate with the emergency service application 220. In an example, the agent communication port 250 is a TCP socket, but could be another type of communication port based on the configuration of the emergency service application 220. Because the desktop agent 240 is a local application installed and executing on the dispatcher computer 210, the agent communication port 250 is able to communicate with other local applications, such as the emergency service application 220. The agent communication port 250 is configured to transmit messages to a given port of the emergency service application 220 over the network connection 242. The emergency service application 220 includes one or more application communication ports (e.g., $1^{st}$ port 226, $2^{nd}$ port 231, and $3^{rd}$ port 236), each of which is configured to receive and transmit information via the network connection 242. In an example, the application communication ports 226, 231, and 236 are TCP ports, but could be other types of communication ports in other embodiments.

The agent communication port 250 and application communication ports 226, 231, and 236 enable communication between the desktop agent 240 and the emergency service application 220. For example, in response to the web-application interface 245 receiving a request from the web-browser 260 to start the fire application 225, the agent communication port 250 sends a message via the network connection 242 to the $1^{st}$ port 226 to start the fire application 225. The agent communication port 250 is also configured to listen to one or more ports for messages communicated by the emergency service application 220. For example, after starting the fire application 225, the agent communication port 250 listens to the $1^{st}$ port 226 and receives messages provided by the fire application 225 via the network connection 242.

The desktop agent 240 may identify the available ports (e.g., ports 226, 231, 236) and port addresses of the emergency service application 220 during installation of the desktop agent 240. An administrator installing the desktop agent 240 may input the types of applications available on the dispatcher computer 210. In another example, the desktop agent 240 may automatically detect the types of applications available on the dispatcher computer 210. As noted above, in some implementations, a subset of applications (e.g., application 225 and 230, but not application 235) may be available on a given dispatcher computer. For each available application, the desktop agent 240 determines the port associated with the application, and stores addressing information for each application so that the agent communication port 250 can transmit messages to and receive messages from the appropriate application during an emergency call. For example, the desktop agent 240 may identify that the $1^{st}$ port 226 is associated with the fire application 225. The desktop agent 240 may then store the association and addressing information such that the desktop agent 240 can transmit and receive messages to and/or from the fire application 225 via a network connection 242 and $1^{st}$ port 226 during an emergency call relating to a fire emergency.

The IP interface 255 is configured to communicate with the cloud-based CAD system 280 via the IP-based network 270. The IP interface 255 may be implemented using an API based on a representational state transfer (REST) architecture. The IP interface 255 transmits messages received from the emergency service application 220 to the cloud-based CAD system 280 via the IP-based network 270. For example, if the agent communication port 250 receives a message from the fire application 225 (e.g., a message describing instructions provided to the dispatcher by the fire application 225, or a message describing caller information input by the dispatcher to the fire application 225 in response to questioning), the agent communication port 250 transmits this message to the IP interface 255, and the IP interface 255 passes the message to the cloud-based CAD system 280. The IP interface 255 may also receive data from the cloud-based CAD system 280, such as configuration information and software updates.

The desktop agent 240 may have one or more processing modules not shown in FIG. 2. For example, the desktop agent 240 may have a processing module for receiving a message from one of the communication interfaces (i.e., the web-application interface 245, the agent communication port 250, and the IP interface 255) and processing the message. Processing the message may involve determining where to forward the message, e.g., determining to pass a message received from the web-browser 260 to the emergency service application 220, and determining which port of the emergency service application 220 to send the message. Processing the communication may involve transforming or reformatting the message in some way, or generating a new message based on the received message. For example, the web-browser 260 may transmit a request to launch a given application (e.g., medical application 230) and a packet of data describing the emergency call (e.g., identity of caller, location of caller, etc.). A processing module may generate a launch message directed to a particular port (in this example, the $2^{nd}$ port 231), and include the packet of data describing the emergency call in the launch message. In some embodiments, the desktop agent 240 includes additional or alternative components and/or communication interfaces. For example, rather than using an API, the desktop agent 240 may communicate with the cloud-based CAD system 280 using the web-application interface 245 as a SignalR hub and the cloud-based CAD system 280 as a SignalR client.

Figure 3A:
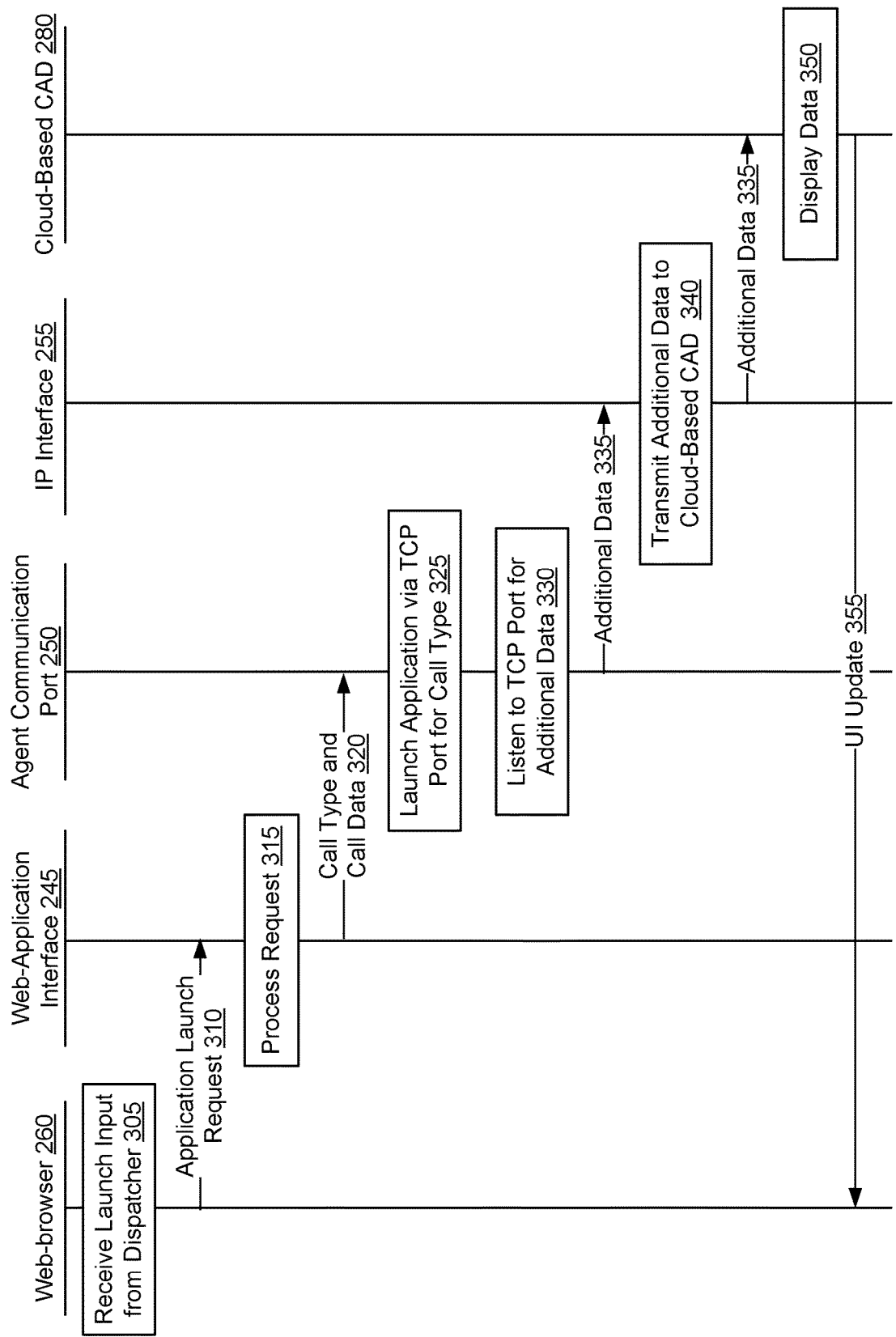
FIG. 3A is an activity diagram showing a process for interacting with an emergency service application, in accordance with an embodiment.

FIG. 3A is an activity diagram showing a process for interacting with an emergency service application, in accordance with an embodiment. The web-browser 260 receives 305 a launch input from a dispatcher. For example, a dispatcher selects a police button in the interface of the cloud-based CAD application 265 provided by the cloud-based CAD system 280 and running on the web-browser 260. Responsive to the launch input from the dispatcher, the web-browser 260 transmits an application launch request 310 to the web-application interface 245 of the desktop agent 240.

The web-application interface 245 of the desktop agent 240 processes 315 the application launch request 310. For example, the web-application interface 245 identifies which application is indicated by the application launch request 310 (e.g., the police application 235). The web-application interface 245, or another processing module of the desktop agent 240, may generate a launch message intended for the police application 235 that includes data describing the emergency call received from the web-browser 260 with the launch request 310. The web-application interface 245 (or other processing module) then provides the emergency call type (e.g., police, fire, or medical) and any additional call data 320 to the agent communication port 250.

The agent communication port 250 launches 325 the identified application via the application communication port for the emergency call type. For example, the agent communication port 250 determines an address for the application communication port (e.g., the $3^{rd}$ port 236 for the police application 235) and transmits a launch message to this address. In response, the emergency service application 220 launches the appropriate application (e.g., the police application 235), which conducts dispatcher questioning in an interface provided by the emergency service application 220. The agent communication port 250 listens to the agent communication port for additional data about the emergency provided by the emergency service application 220. For example, if the police application 235 determines an incident type, provides instructions to the dispatcher, or determines or receives other additional data relating to the emergency call, the police application 235 transmits this additional data over the $3^{rd}$ application communication port 236. While a call is ongoing, the agent communication port 250 listens for such messages sent from the emergency service application 220 over the application communication port.

When the agent communication port 250 receives additional data, the agent communication port forwards the additional data 335 to the IP interface 255. The IP interface 255 transmits 340 the additional data to the cloud-based CAD system 280 over the IP-based network 270. The IP interface 255 may forward all data received from the agent communication port 250 to the cloud-based CAD system 280. The IP interface 255 or another processing module of the desktop agent 240 may perform some processing prior to the agent communication port 250 forwarding the data, e.g., wrapping the additional data 335 with data identifying the dispatcher computer 210, the caller, the dispatcher, etc., or reformatting the additional data prior to forwarding it.

The cloud-based CAD system 280 receives the additional data 335 transmitted from the IP interface 255 of the desktop agent 240. The cloud-based CAD system 280 displays 350 the additional data 335 or some portion of the additional data 335 to the dispatcher via the cloud-based CAD application 265. To display data to the dispatcher, the cloud-based CAD system 280 transmits a UI (user interface) update 355 to the web-browser 260.

Figure 3B:
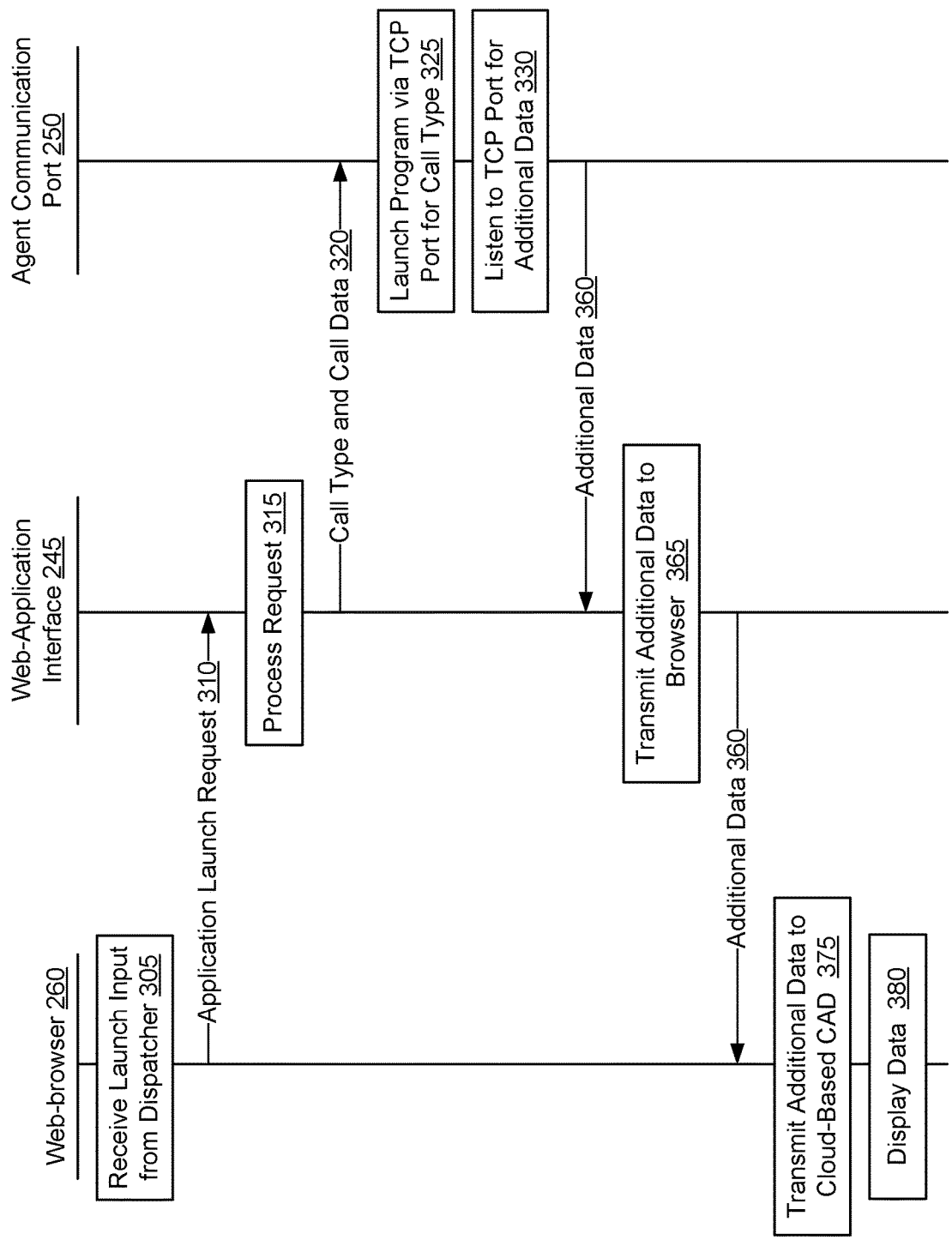
FIG. 3B is an activity diagram showing an alternative process for interacting with an emergency service application, in accordance with an embodiment.

FIG. 3B is an activity diagram showing an alternative process for interacting with an emergency service application, in accordance with an embodiment. In the process shown in FIG. 3A, the communication between the web-browser 260 and the desktop agent 240 is one-way: the web-browser 260 transmits requests to the desktop agent 240, but the desktop agent 240 does not pass data back to the web-browser 260 and instead passes the additional data 335 to the cloud-based CAD 280 via the IP interface 255. In the embodiment shown in FIG. 3B, the communication between the web-browser 260 and the desktop agent 240 is two-way: the desktop agent 240 also passes data to the web-browser 260. In the embodiment of FIG. 3B, the desktop agent 240 may not have an IP interface 255. Instead, the desktop agent 240 communicates with the cloud-based CAD system 280 via the web-browser 260.

The interactions between the web-browser 260, the web-application interface 245, and the agent communication port 250 through step 330 in FIG. 3B are the same as shown in FIG. 3A.

The desktop agent 240 listens 330 to the agent communication port 250 for additional data at the agent communication port 250, and the desktop agent 240 receives additional data at the agent communication port 250. The agent communication port 250 transmits the received additional data 360 to the web-application interface 245. The web-application interface 245 then transmits 365 the additional data 360 to the web-browser 260. As described with respect to FIG. 2, the web-application interface 245 maintains an open, real-time communications channel to the web-browser 260. In an example embodiment, the web-application interface 245 and web-browser 260 employ SignalR to transmit and receive the additional information, respectively. The agent communication port 250, web-application interface 245, or other processing module of the desktop agent 240 may perform processing of the additional data 360, e.g., reformatting or wrapping the additional data 360.

Upon receiving the additional data 360, the web-browser 260 transmits 375 the additional data to the cloud-based CAD system 280. In addition, the web-browser 260 displays 380 the data to the dispatcher in the user interface of the cloud-based CAD application 265. In some embodiments, the web-browser 260 transmits the additional data to the cloud-based CAD system 280 upon receipt, and then the cloud-based CAD system 280 provides a UI update to the web-browser 260, as described with respect to FIG. 3A. In other embodiments, the web-browser 260 displays the additional data directly upon receipt from the web-application interface 245.

Figure 4:
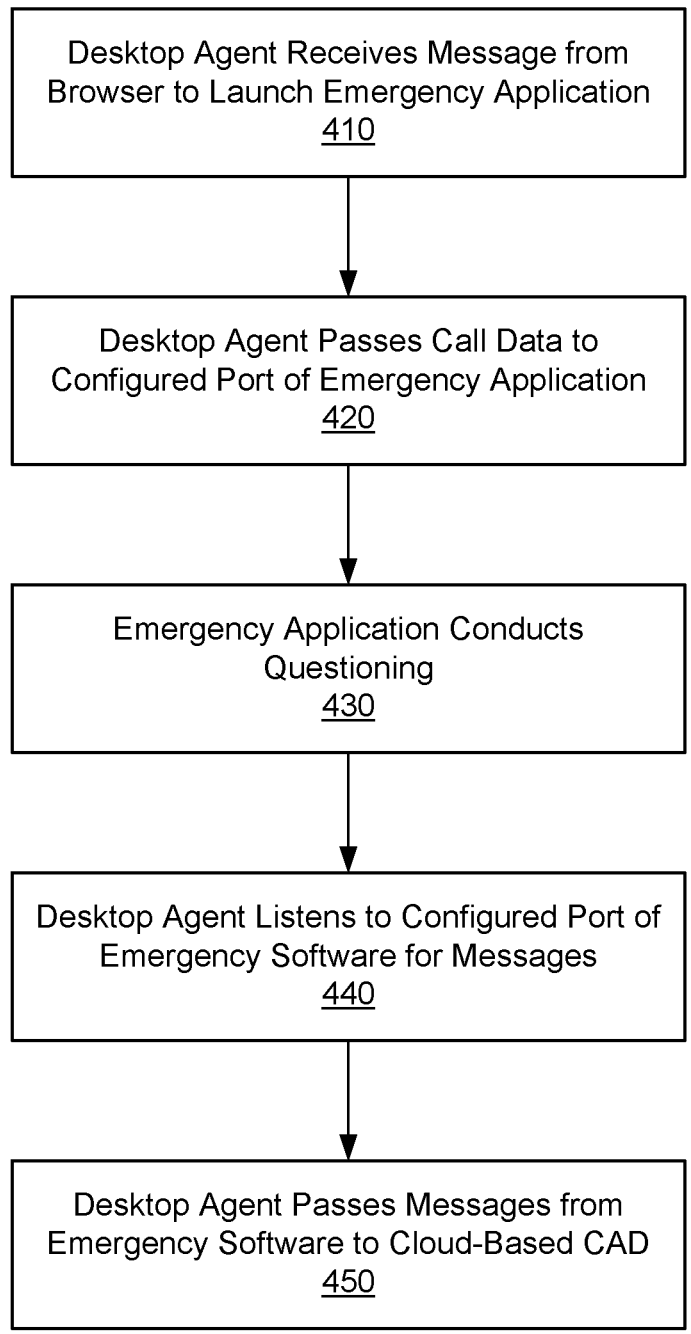
FIG. 4 is a flowchart showing a process for interacting with an emergency services application, in accordance with an embodiment.

FIG. 4 is a flowchart showing a process 400 for interacting with an emergency service application, in accordance with an embodiment. The steps of the process 400 may be performed by the dispatcher computer 210, and in particular, by the desktop agent 240 and the emergency service application 220, as described below. Some or all of the steps may be performed by other modules in other embodiments. In addition, other embodiments may include different and/or additional steps and the steps may be performed in different orders.

The desktop agent 240 receives 410 a message from a web-browser to launch an emergency service application. For example, the web-application interface 245 of the desktop agent 240 receives a message from the web-browser 260, which is running a cloud-based CAD application 265, to launch a particular application (e.g., police application 235) of the emergency service application 220.

The desktop agent 240 passes 420 call data to a configured port of the emergency service application. For example, the agent communication port 250 transmits a launch message to a particular application communication port (e.g., $3^{rd}$ port 236) of the emergency service application 220 with initial call data describing the emergency call. The application communication port for each available application is pre-configured, and desktop agent 240 selects the TCP port based on the type of emergency call.

The emergency service application 220 conducts 430 questioning to the dispatcher about the emergency call. For example, the selected application (e.g., police application 235) displays a pre-configured set of questions to the dispatcher, and the dispatcher provides answers to these questions in the on-screen interface based on information from the caller. The selected application continues to provide questions based on further information about the call, e.g., based on the responses input by the dispatcher to the selected application. In other embodiments, the emergency service application 220 may perform additional or alternative functions for assisting a dispatcher in response to an emergency call.

The desktop agent 240 listens 440 to the configured port of the emergency service application 220 for messages. For example, the agent communication port 250 of the desktop agent 240 listens to the same port used for step 420 (e.g., $3^{rd}$ port 236) for additional data about the emergency call provided by the selected application (e.g., police application 235) of the emergency service application 220.

The desktop agent 240 passes 450 messages from the emergency service application 220 to a cloud-based CAD system 280. For example, the agent communication port 250 passes additional data received from the emergency service application 220 to the IP interface 255, and the IP interface 255 transmits the additional data to the cloud-based CAD system 280 via the IP-based network 270. In another example, the agent communication port 250 passes additional data received from the emergency service application 220 to the web-application interface 245, and the web-application interface 245 transmits the additional data to the web-browser 260. The web-browser 260 in turn transmits the additional data to the cloud-based CAD system 280 via the IP-based network 270.

The desktop agent 240 is described herein in the context of an emergency dispatch system. In other embodiments, the desktop agent 240 may be used in alternative contexts to allow a browser-based application to communicate with a local application that is configured to communicate over one or more network connections, e.g., one or more TCP ports. For example, a computer system executes a web-based application in a browser, such as web-browser 260, and a local application configured to communicate over a network connection. The computer system also executes the desktop agent 240, which is installed locally on the computer system.

The desktop agent 240 can interface between the web-based application and the local application in a similar manner as described above. For example, the desktop agent 240 receives a request from the web-based application to launch the local application, e.g., at the web-application interface 245. The desktop agent 240 (e.g., the agent communication port 250) transmits a launch message to a network communication port (e.g., a TCP port) of the local application. The desktop agent 240 may select a communication port (e.g., a particular TCP port) of the local application based on the request from the web-based application. The desktop agent 240 (e.g., the agent communication port 250) receives data from the local application as the local application executes. The desktop agent 240 transmits data received from the local application to the web-based application (e.g., via the web-application interface 245) and/or an external system (e.g., via an IP interface 255).

Figure 5:
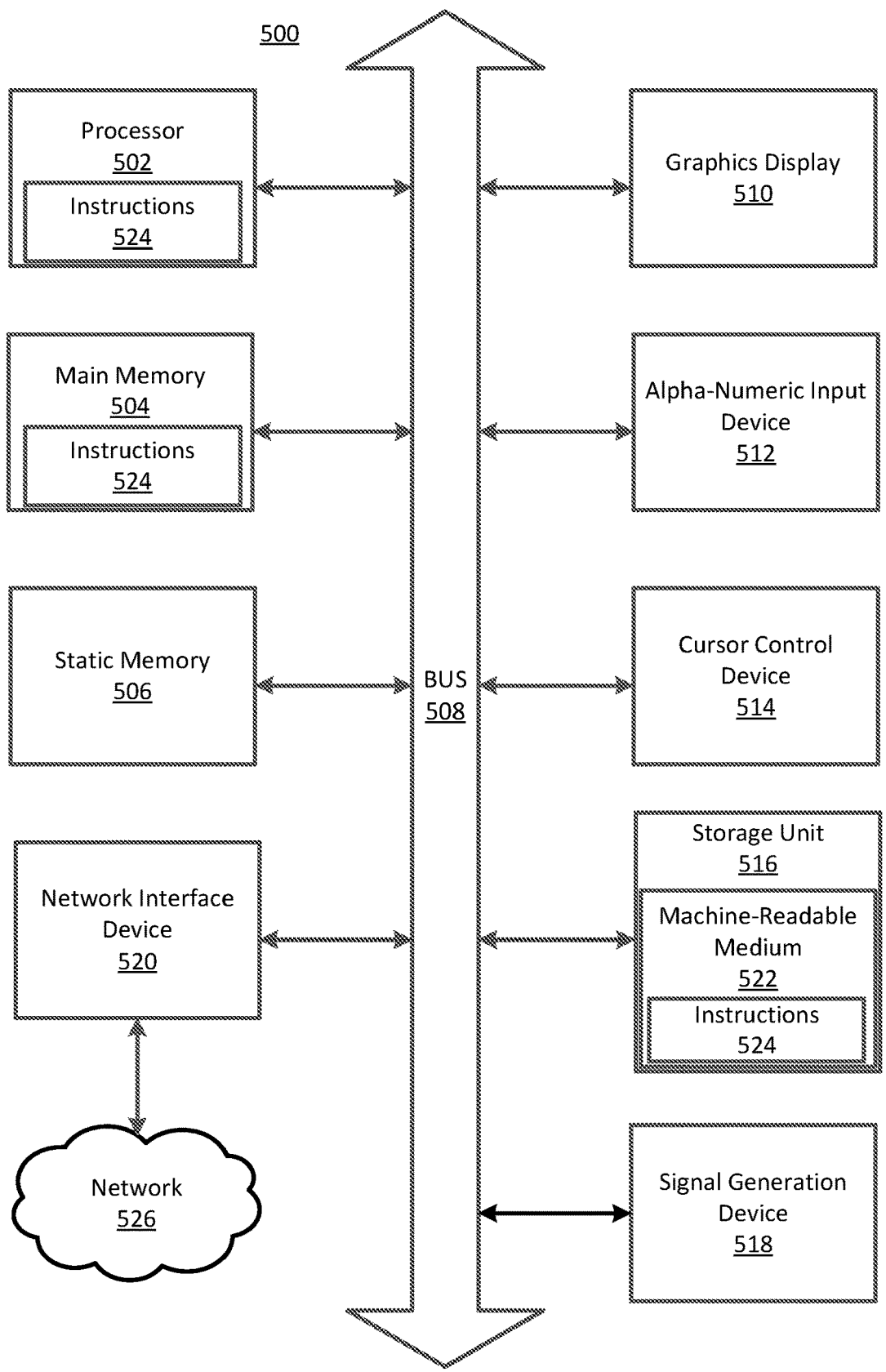
FIG. 5 is a block diagram illustrating components of an example machine for reading and executing instructions from a machine-readable medium.

FIG. 5 is a block diagram illustrating components of an example machine for reading and executing instructions from a machine-readable medium. Specifically, FIG. 5 shows a diagrammatic representation of one or more of the systems (e.g., dispatcher computer 210, cloud-based CAD system 280, etc.) represented in FIG. 2 in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 500 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a non-transitory machine-readable storage medium 522 on which is stored instructions 524 (e.g., software) embodying any one or more of the methodologies or functions described herein. For example, the instructions 524 may include the functionalities of modules of the dispatcher computer 210 described in FIG. 2. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 (e.g., IP-based network 270) via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a desktop agent. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A method comprising:
receiving, at a desktop agent, an application launch request for an emergency service application, wherein:
the emergency service application comprises a plurality of application communication ports, each application communication port associated with a respective one of a plurality of emergency service types, and
the application launch request comprises data indicating one of the plurality of emergency service types;
identifying, by the desktop agent, one of the plurality of application communication ports based on the application launch request;
generating, by the desktop agent, a launch message for the emergency service application to launch the emergency service application;
transmitting the launch message from the desktop agent to the identified application communication port; and
receiving, at the desktop agent from the identified application communication port, information collected by the emergency service application.

2. The method of claim 1, further comprising transmitting the information collected by the emergency service application via an Internet Protocol (IP) interface of the desktop agent.

3. The method of claim 1, further comprising:
providing the information to a web-application interface of the desktop agent;
processing, using the web-application interface, the information for transmission to a web-browser; and
transmitting the information from the web-application interface to the web-browser.

4. The method of claim 1, further comprising:
identifying, by the desktop agent, the plurality of application communication ports of the emergency service application;
determining an emergency service type of the plurality of emergency service types for each identified application communication port;
associating each identified application communication port with its determined emergency service type; and
storing the associations between the identified application communication ports and determined emergency service types.

5. The method of claim 1, wherein:
a web-application interface of the desktop agent receives the application launch request from a web-based application, and
an agent communication port of the desktop agent transmits the launch message to the identified application communication port.

6. The method of claim 5, wherein the web-application interface comprises a SignalR hub, and the web-based application comprises a SignalR client.

7. The method of claim 1, wherein the desktop agent and the emergency service application are executing on a computer system configured for handling emergency calls, and the plurality of emergency service types comprise fire, police, and medical services.

8. A computer system comprising a processor and a memory, the computer system configured to execute a desktop agent comprising:
a web-application interface configured to receive an application launch request for an emergency service application from a web-based application executing in a browser,
the emergency service application comprising a plurality of application communication ports, each application communication port associated with a respective one of a plurality of emergency service types;
an agent communication port configured to:
select one of the plurality of application communication ports based on an emergency service type indicated by the application launch request,
transmit a launch message to the selected application communication port, and
receive, from the selected application communication port, information collected by the emergency service application, the information collected by the emergency service application responsive to the launch message.

9. The computer system of claim 8, wherein the web-application interface is configured to transmit the information collected by the emergency service application to the web-based application.

10. The computer system of claim 8, further comprising an Internet Protocol (IP) interface configured to transmit the information collected by the emergency service application over the Internet.

11. The computer system of claim 8, the desktop agent configured to:
identify the plurality of application communication ports of the emergency service application;
determine an emergency service type of the plurality of emergency service types for each identified application communication port;
associate each identified application communication port with its determined emergency service type; and
store the associations between the identified application communication ports and determined emergency service types.

12. The computer system of claim 8, wherein the web-application interface comprises a SignalR hub, and the web-based application comprises a SignalR client.

13. The computer system of claim 8, wherein:
the computer system is configured for handling emergency calls, and the plurality of emergency service types comprise fire, police, and medical services.

14. A non-transitory computer readable storage medium storing instructions that, when executed by a processor, cause the processor to:
receive an application launch request for an emergency service application, wherein:
the emergency service application comprises a plurality of application communication ports, each application communication port associated with a respective one of a plurality of emergency service types, and
the application launch request comprises data indicating one of the plurality of emergency service types;
identify one of the plurality of application communication ports based on the application launch request;
generate a launch message for the emergency service application to launch the emergency service application;
transmit the launch message to the identified application communication port; and
receive, from the identified application communication port, information collected by the emergency service application.

15. The non-transitory computer readable storage medium of claim 14, wherein the instructions further cause the processor to transmit the information collected by the emergency service application via an Internet Protocol (IP) interface.

16. The non-transitory computer readable storage medium of claim 14, wherein the instructions further cause the processor to:
provide the information to a web-application interface;
process, using the web-application interface, the information for transmission to a web-browser; and
transmit the information from the web-application interface to the web-browser.

17. The non-transitory computer readable storage medium of claim 14, wherein the instructions further cause the processor to:
identify the plurality of application communication ports of the emergency service application;
determine an emergency service type of the plurality of emergency service types for each identified application communication port;
associate each identified application communication port with its determined emergency service type; and store the associations between the identified application communication ports and determined emergency service types.

18. The non-transitory computer readable storage medium of claim 14, wherein:
a web-application interface receives the application launch request from a web-based application, and
an agent communication port transmits the launch message to the identified application communication port.

19. The non-transitory computer readable storage medium of claim 18, wherein the web-application interface comprises a SignalR hub, and the web-based application comprises a SignalR client.

20. The non-transitory computer readable storage medium of claim 14, wherein the processor is part of a computer system configured for handling emergency calls, and the plurality of emergency service types comprise fire, police, and medical services.

\* \* \* \* \*